United States Patent Office 3,474,129
Patented Oct. 21, 1969

---

3,474,129
PROCESS FOR THE PREPARATION OF α,β-UNSATURATED ORGANIC COMPOUNDS
Günter Kolb, Cologne-Stammheim, and Erwin Müller, Leverkusen, Germany, assignors to Farbenfabriken Bayer Aktiengesellschaft, Leverkusen, Germany, a German corporation
No Drawing. Filed July 9, 1964, Ser. No. 381,515
Claims priority, application Germany, Aug. 20, 1963, F 40,539
Int. Cl. C07c 69/52, 103/10
U.S. Cl. 260—479           4 Claims

ABSTRACT OF THE DISCLOSURE

It has been found that α,β-unsaturated organic compounds which contain the group

—CO—NM—CH$_2$—NH—COOR at least once can be prepared by reacting α,β-unsaturated carboxylic acid amides with carbamic acid esters in the presence of formaldehyde or precondensates of α,β-unsaturated carboxylic acid amides and formaldehyde with carbamic acid esters or precondensates of carbamic acid esters and formaldehyde with α,β-unsaturated carboxylic acid amides at pH values $\leq 7$.

---

Thus, the method according to the invention is based, as is apparent, on Reaction I

It follows directly from this that the corresponding formaldehyde precondensates of α,β-unsaturated carboxylic acid amides or of the carbamic acid esters can be used instead of their starting components formaldehyde/α,β-unsaturated carboxylic acid amide or formaldehyde/carbamic acid ester in accordance with reaction I(a) or I(b).

I(a)

I(b)

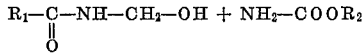

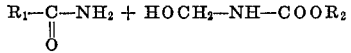

In the above formulae, R$_1$ is an aliphatic or cycloaliphatic radical with a carbon-carbon double bend in the α-position to the carbonyl group, R$_2$ is an alkyl group, cycloalkyl group, aralkyl group or aryl group.

α,β-Unsaturated carboxylic acid amides suitable for the present process are in particular amides of α,β-unsaturated monocarboxylic acids with up to four carbon atoms such as acrylic acid and methacrylic acid. Apart from that, the reaction can, in principle, also be carried out with diamides or semi-amides of higher acids as well as polybasic acids, such, for example, as maleic acid, fumaric acid, itaconic acid etc.

Examples of carbamic acid esters are: Carbamic acid methyl ester, carbamic acid ethyl ester, carbamic acid propyl ester, carbamic acid allyl ester, carbamic acid-n-butyl ester, carbamic acid-tertiary-butyl ester, carbamic acid cyclohexyl ester, carbamic acid phenyl ester, carbamic acid-p-chlorophenyl ester, carbamic acid-p-nitrophenyl ester etc. Preferred carbamic acid esters are those with 1 to 6 carbon atoms in the ester group.

The reaction of α,β-unsaturated carboxylic acid amides with carbamic acid esters in the presence of formaldehyde or of compounds which give off formaldehyde (such as paraformaldehyde, trioxymethylene etc.) may be carried out by bringing the reaction components together in approximately equimolar quantities, although formaldehyde may be added in excess, and leaving the mixture to react at pH values below 7.

A completely analogous procedure is used when a precondensate of formaldehyde is to be used with one of the two condensation components. The reaction may be carried out with or without solvent, preferably in the aqueous phase. It is not necessary to isolate the individual reaction stages. If desired, the reaction may also be carried out in a melt. The reaction temperature should preferably not greatly exceed 100° C.

The reaction times are chosen to be as short as possible but long enough for quantitative reaction. The pH may be adjusted with any organic or inorganic compounds having an acid reaction, such as acetic acid, trichloroacetic acid, oxalic acid, maleic acid, organic sulphonic acids such as p-toluenesulphonic acid, sulphuric acid, hydrochloric acid, nitric acid, phosphoric acid and other compounds. It is advisable to add small quantities of a polymerisation inhibitor such as phenothiazine, hydroquinone or tertiary butyl pyrocatechol to the reaction mixture.

Surprisingly, it has been found the N,N-methylene-bis-compounds of α,β-unsaturated carboxylic acid amide or of carbamic acid esters are produced to only a very minor extent if at all in the proces of the invention.

The compounds obtainable by the method described above represent analeptics of unexpectedly low toxicity. They can also be used as plant protective agents or as stabilisers and age-resistors in the plastics industry.

The parts given in the following examples are parts by weight unless otherwise indicated.

EXAMPLE 1

51 parts carbamic acid ethyl ester, 51 parts methacrylamide and 21 parts paraformaldehyde, 0.2 part tertiary butyl pyrocatechol and 0.3 part conc. hydrochloric acid are brought together in a suitable reaction vessel and intimately mixed. After heating the reaction mixture for 30 minutes to 75° C., it is left to cool to room temperature. The crystalline material is recrystallised from acetone. 75 parts of a white crystalline powder of M.P. 126° C. are obtained.

Analysis gave the following values for the compound of the formula:

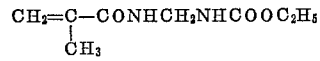

Calculated: C, 51.6; H, 7.5; O, 25.8; N, 15.05. Found: C, 51.49; H, 7.39; O, 26.05; N. 14.84.

EXAMPLE 2

50 parts of a 40% aqueous formaldehyde solution, 51 parts methacrylamide and 0.1 part phenothiazine are added to 50 parts acetone and the pH is adjusted to 9 by the addition of 10% aqueous potassium carbonate solution. The reaction mixture is then stirred for 15 minutes at 50° C., 51 parts carbamic acid ethyl ester are added, the pH is adjusted to 2 with concentrated hydrochloric acid and the mixture stirred for another 45 minutes at 50° C. The reaction mixture is cooled and 89 parts of a white crystalline substance are isolated by vacuum filtration and dried; after recrystallisation from acetone, this substance has a melting point of 126 to 128° C.

EXAMPLE 3

A mixture of 50 parts of a 40% aqueous formaldehyde solution, 42.6 parts acrylamide and 0.025 part phenothiazine is adjusted to a pH of 9 with 10% potassium carbonate solution and stirred for 10 minutes at 50° C. 53.4 parts carbamic acid ethyl ester and 1.0 part conc. hydrochloric acid are then added and the mixture heated for another 40 minutes at 60° C. The reaction mixture is concentrated in vacuo and the reaction product is isolated by vacuum filtration. After drying, 88 parts of a crystalline substance are obtained which has a melting point of 128 to 130° C. after recrystallization from acetone.

Analysis gave the following values for the compound of the formula:

Calculated: C, 48.8; H, 7.0; O, 27.9; N, 16.3. Found: C, 48.52; H, 7.09; O, 28.15; N, 16.20.

EXAMPLE 4

A mixture of 85 parts methacrylamide, 75 parts 40% aqueous formaldehyde solution and 0.03 part phenothiazine is adjusted to a pH of 9 with 10% aqueous potassium carbonate solution and stirred for 10 minutes at 50° C. 75 parts carbamic acid methyl ester and 0.5 part conc. hydrochloric acid are then added and the mixture stirred for another 35 minutes at 60° C. The reaction mixture solidifies on cooling. It is crystallized from acetone and 135 parts of a white crystalline substance of M.P. 130 to 131.5° C. are obtained.

Analysis gave the following figures for the compound of the formula:

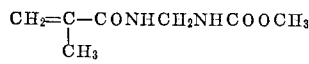

Calculated: C, 48.8; H, 7.0; O, 27.9; N, 16.3. Found: C, 48.65; H, 7.19; O, 28.24; N, 16.32.

EXAMPLE 5

The mixture of 195 parts methacrylamide, 195 parts 40% formaldehyde solution and 0.25 part phenothiazine is adjusted to pH 9 with 10% aqueous potassium carbonate solution and heated to 50° C. for 15 minutes. 300 parts carbamic acid phenyl ester are then added, the pH adjusted to 2 with 10% aqueous sulphuric acid and the reaction mixture heated to 60° C. for 30 minutes. When cold, a crystalline substance is obtained which after separation, drying and recrystallisation from acetone, has a melting point of 159 to 161° C.

Analysis gave the following figures for the compound of the formula:

Calculated: C, 61.5; H, 6.0; O, 20.5; N, 12.0. Found: C, 61.21; H, 6.10; O, 20.60; N, 11.95.

What we claim is:

1. A process for preparing α,β-unsaturated organic compounds containing the group:

wherein R is lower alkyl or phenyl which comprises heating substantially equimolar proportions of (a) an α,β-unsaturated monocarboxylic acid amide containing up to 4 carbon atoms, (b) formaldehyde or a compound which yields formaldehyde and (c) a carbamic acid ester wherein the esterifying moiety is lower alkyl or phenyl to a temperature of up to about 100° C. at a pH of 7 or below.

2. The process of claim 1 wherein excess formaldehyde is present during said heating step.

3. A process for preparing α,β-unsaturated organic compounds containing the group:

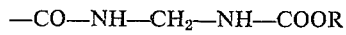

wherein R is lower alkyl or phenyl which comprises heating substantially equimolar proportions of a precondensate of an α,β-unsaturated monocarboxylic acid amide containing up to 4 carbon atoms and formaldehyde with a carbamic acid ester wherein the esterifying moiety is lower alkyl or phenyl to a temperature of up to about 100° C. at a pH of 7 or below.

4. A process for preparing α,β-unsaturated organic compounds containing the group:

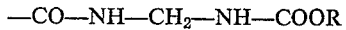

wherein R is lower alkyl or phenyl which comprises heating substantially equimolar proportions of a precondensate of formaldehyde and a carbamic acid ester wherein the esterifying moiety is lower alkyl or phenyl with an α,β-unsaturated monocarboxylic acid amide containing up to 4 carbon atoms to a temperature of up to about 100° C. at a pH of 7 or below.

References Cited

UNITED STATES PATENTS 2,022,233    11/1953    Ellis _____ 260—3

LORRAINE A. WEINBERGER, Primary Examiner

M. G. BERGER, Assistant Examiner

U.S. Cl. X.R.

260—468, 482, 557, 561